(12) United States Patent
Bae et al.

(10) Patent No.: US 12,276,626 B2
(45) Date of Patent: Apr. 15, 2025

(54) FLAME TRANSFER FUNCTION MEASUREMENT SYSTEM FOR PREDICTION AND REDUCTION OF COMBUSTION INSTABILITY

(71) Applicant: Seoul National University R&DB Foundation, Seoul (KR)

(72) Inventors: Jinhyun Bae, Seoul (KR); Youngbin Yoon, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 254 days.

(21) Appl. No.: 17/903,890

(22) Filed: Sep. 6, 2022

(65) Prior Publication Data
US 2023/0020400 A1 Jan. 19, 2023

Related U.S. Application Data

(63) Continuation-in-part of application No. 16/882,701, filed on May 25, 2020, now abandoned.

(51) Int. Cl.
*G01N 25/28* (2006.01)
*F23N 5/08* (2006.01)

(52) U.S. Cl.
CPC ............... *G01N 25/28* (2013.01); *F23N 5/08* (2013.01); *F23N 2229/20* (2020.01)

(58) Field of Classification Search
CPC ........ G01N 25/28; F23N 5/08; F23N 2229/20
See application file for complete search history.

(56) References Cited

U.S. PATENT DOCUMENTS 6,640,549 B1 * 11/2003 Wilson ................. F23M 20/005
60/776
2014/0376589 A1 * 12/2014 Karp ..................... G01M 15/14
29/428

FOREIGN PATENT DOCUMENTS

| CA | 2511430 C | * | 2/2010 | ............. F23D 11/26 |
| FR | 3030688 A1 | * | 6/2016 | ............. F23C 9/006 |
| KR | 20160009889 A | * | 12/2016 | ............... F23N 5/26 |

* cited by examiner

*Primary Examiner* — Francis C Gray
(74) *Attorney, Agent, or Firm* — Han's Law Office

(57) ABSTRACT

The present disclosure relates to a flame transfer function measurement system for prediction and reduction of combustion instability.

5 Claims, 12 Drawing Sheets

[FIG. 1]
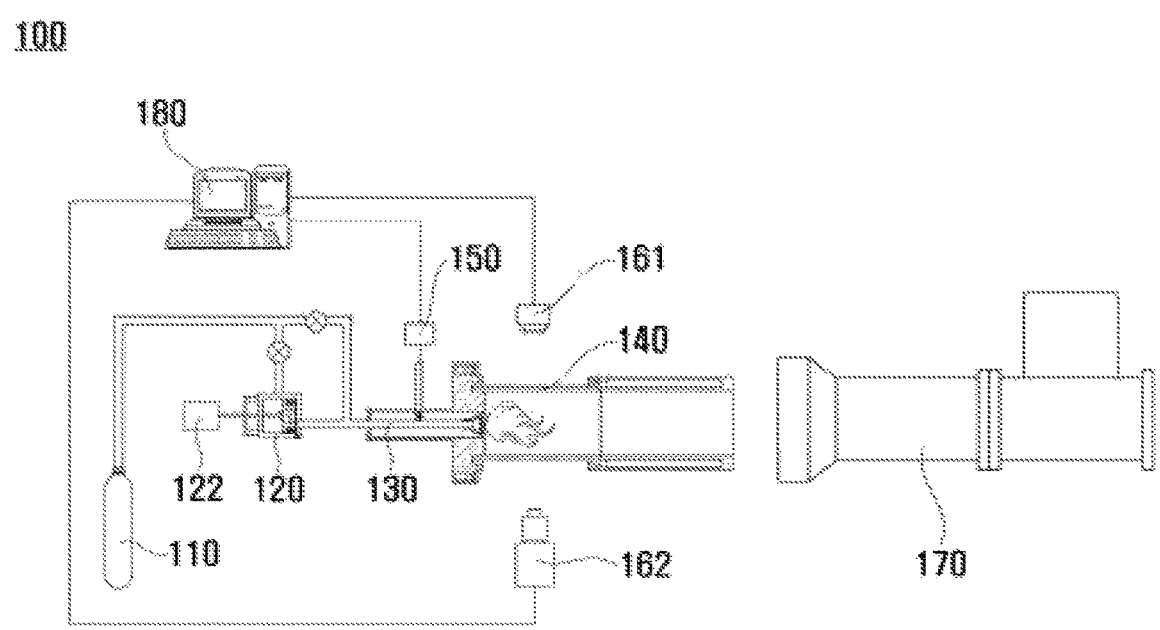

[FIG. 2]
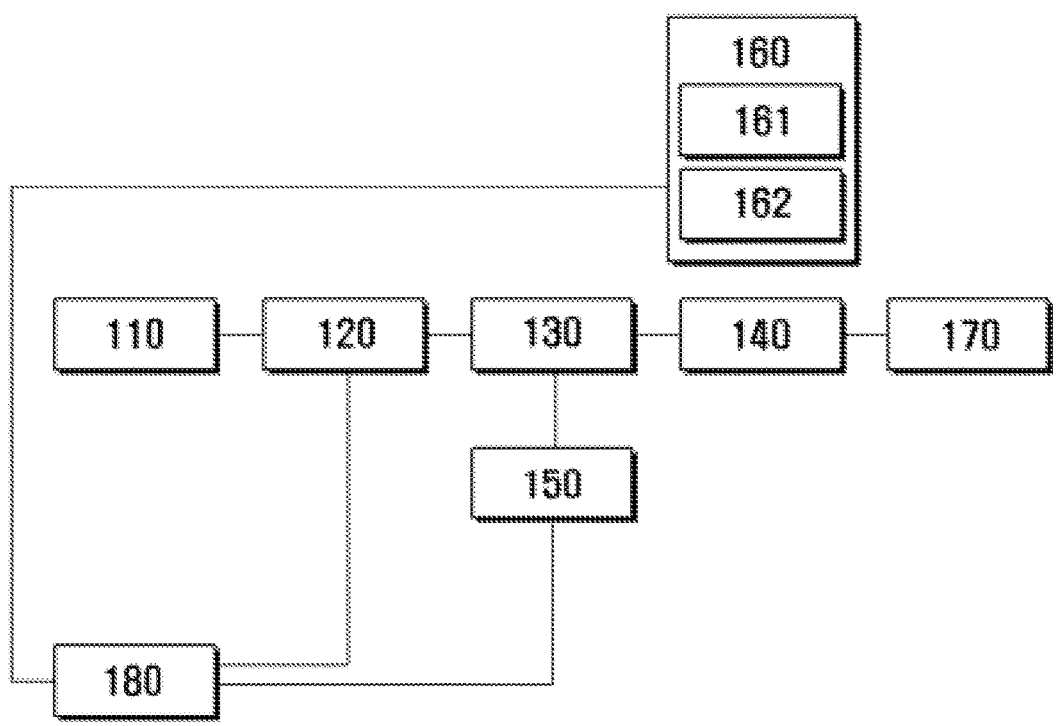

[FIG. 3]
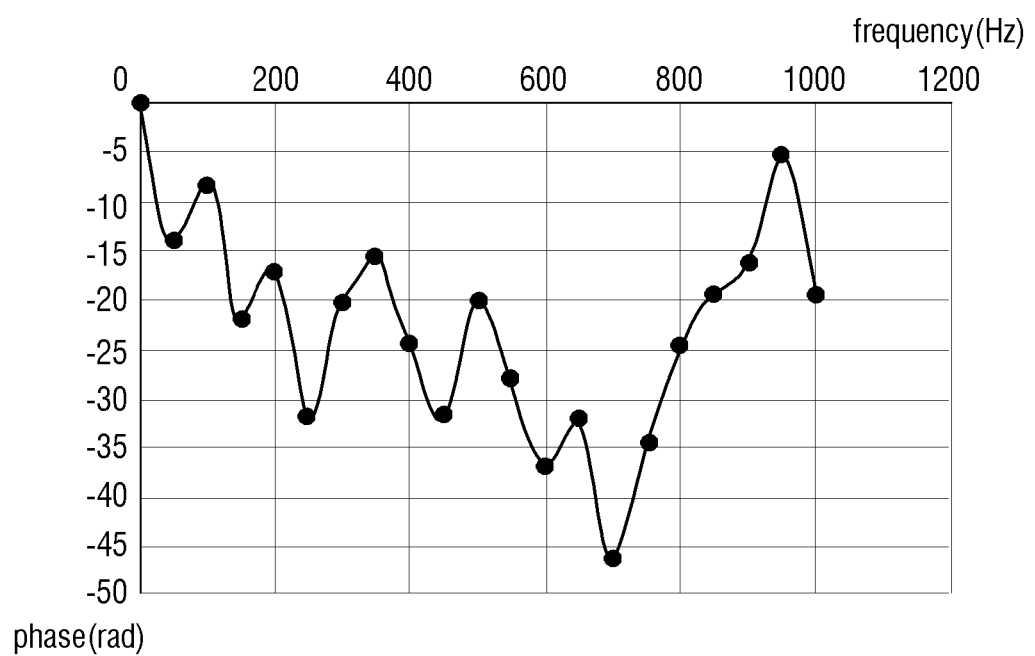

[FIG. 4]
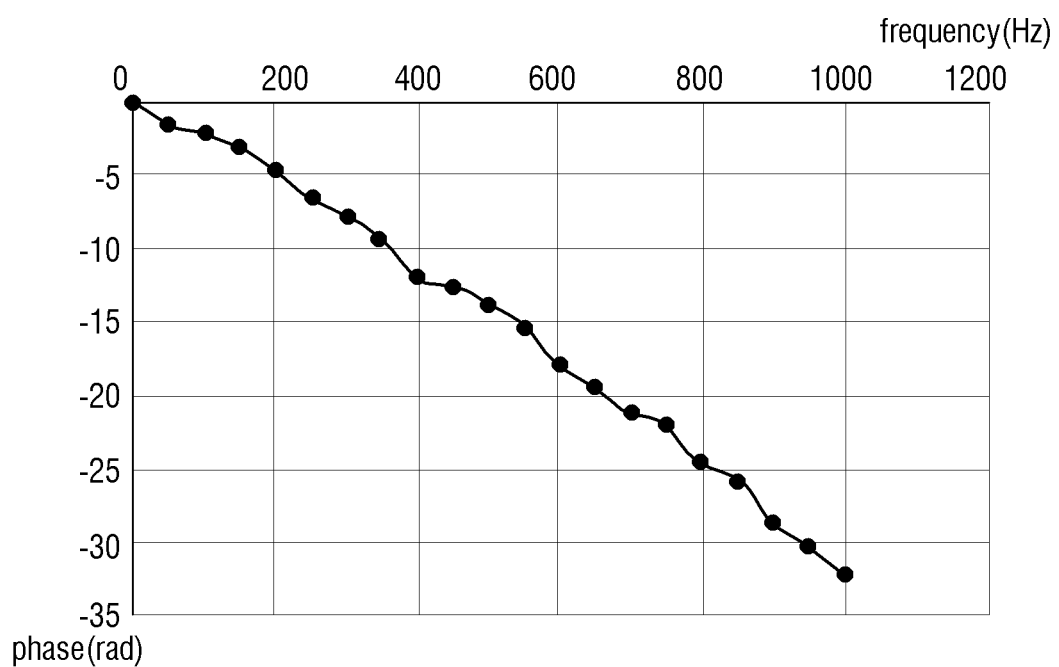

[FIG. 5]
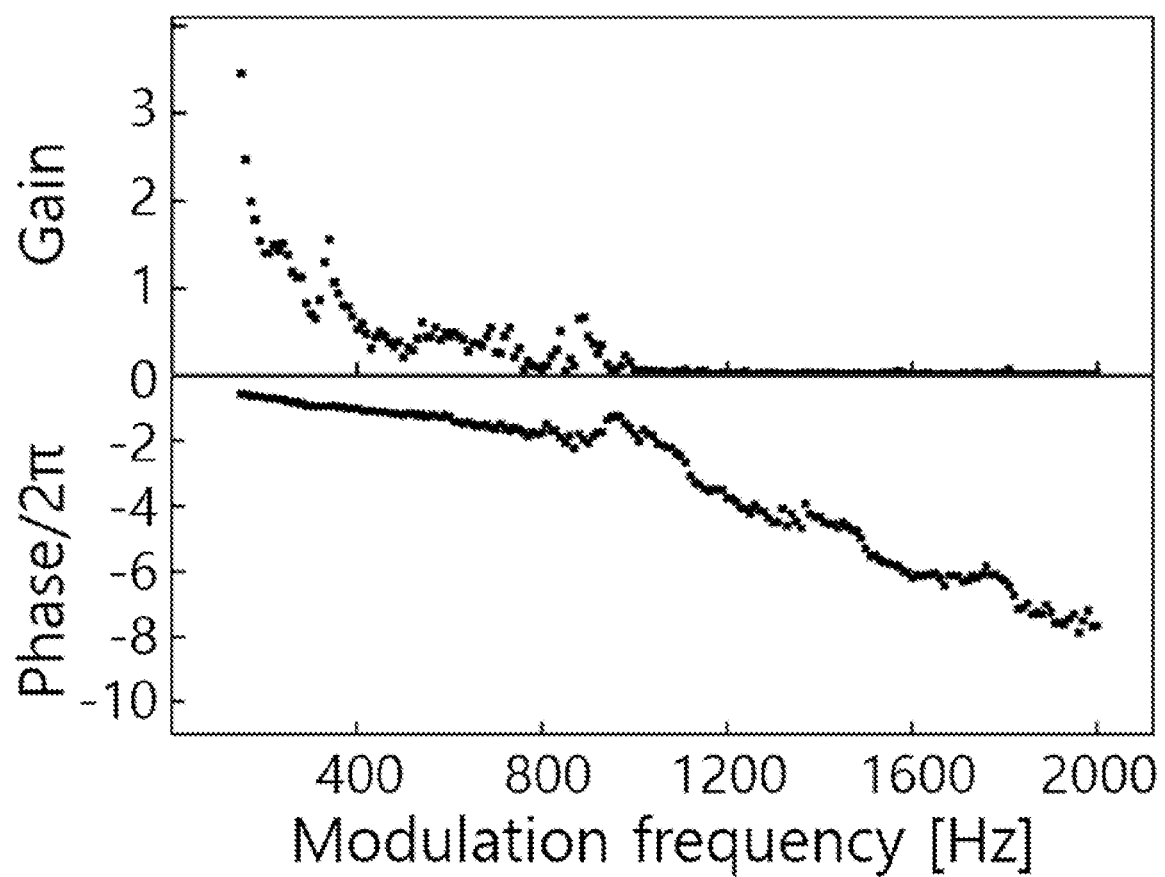

[FIG. 6]
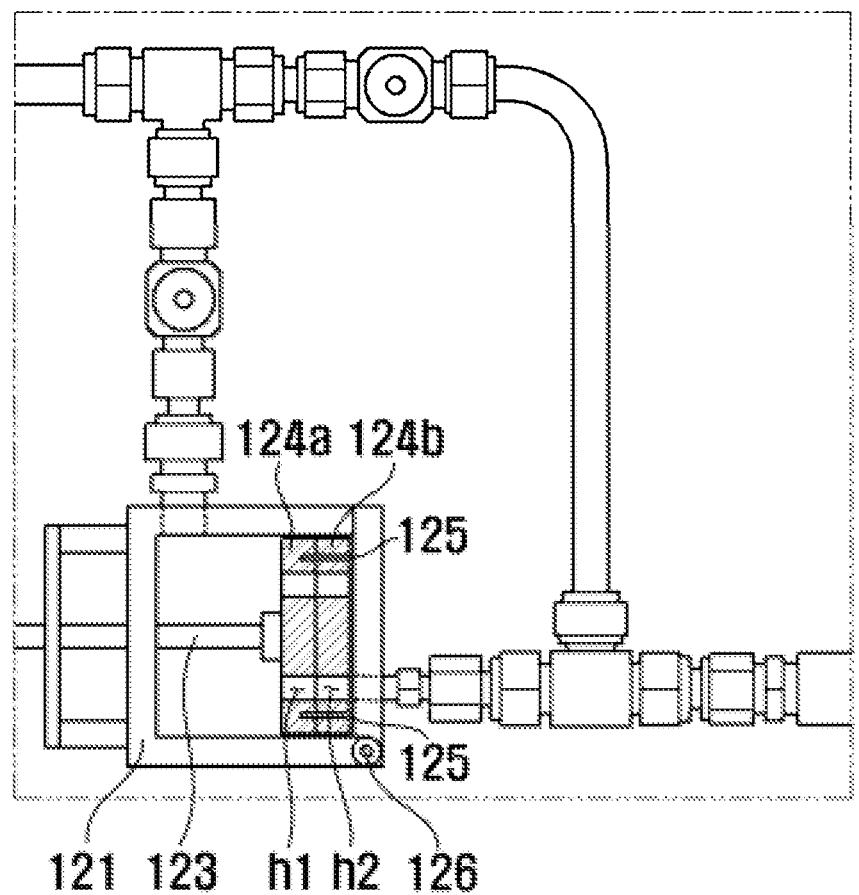

[FIG. 7]
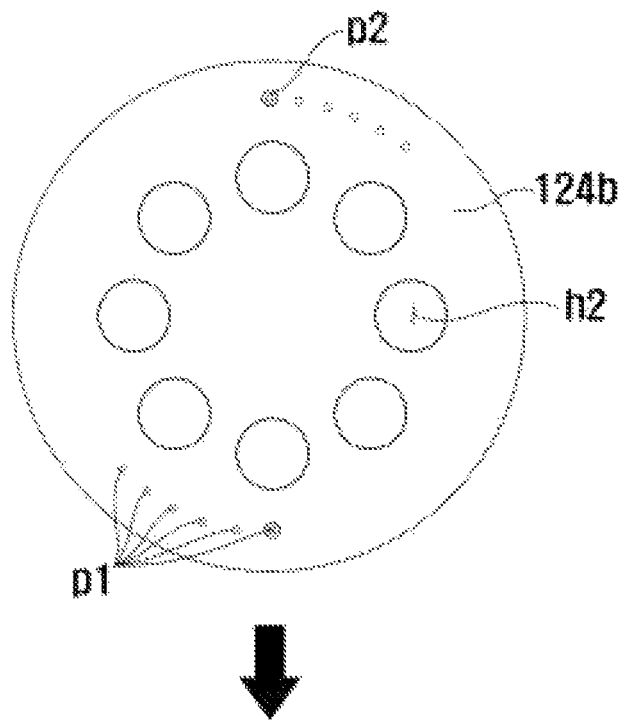
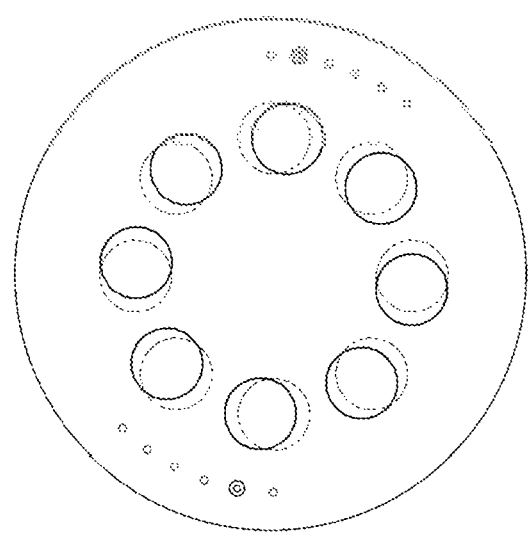

[FIG. 8]
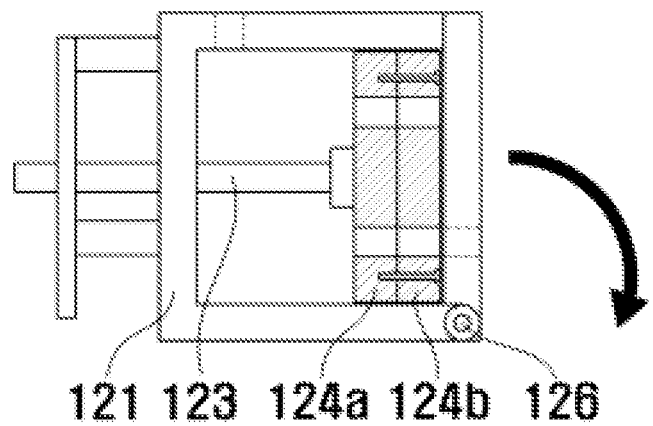
121 123 124a 124b 126
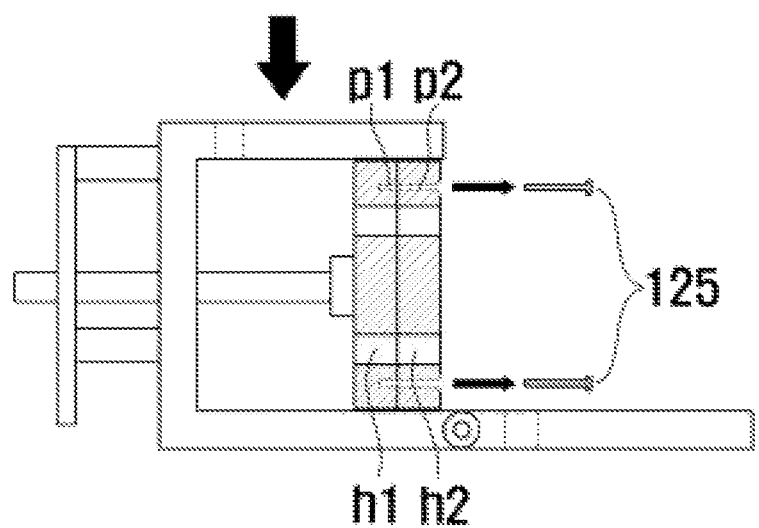
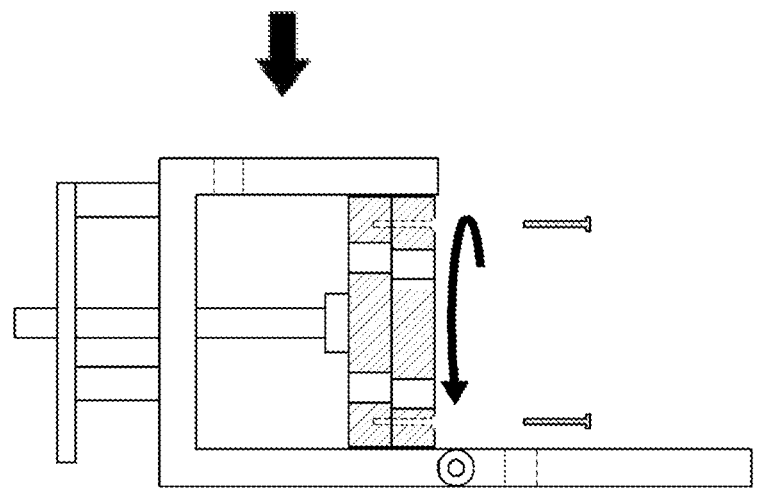

[FIG. 9]
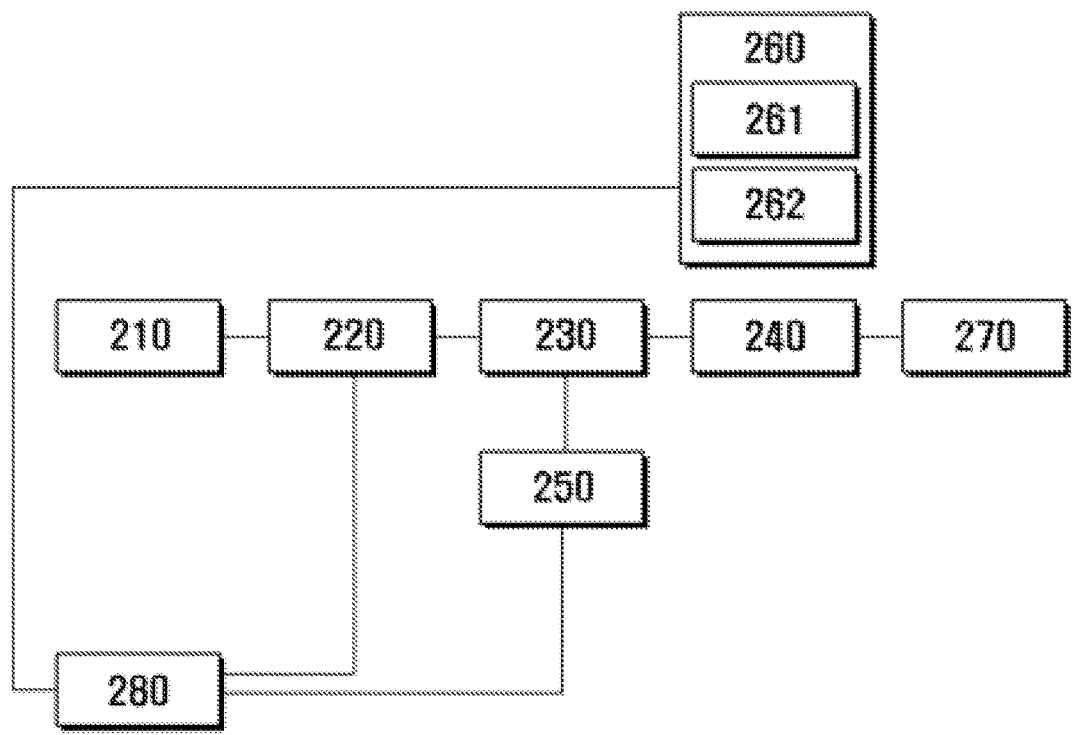

[FIG. 10]
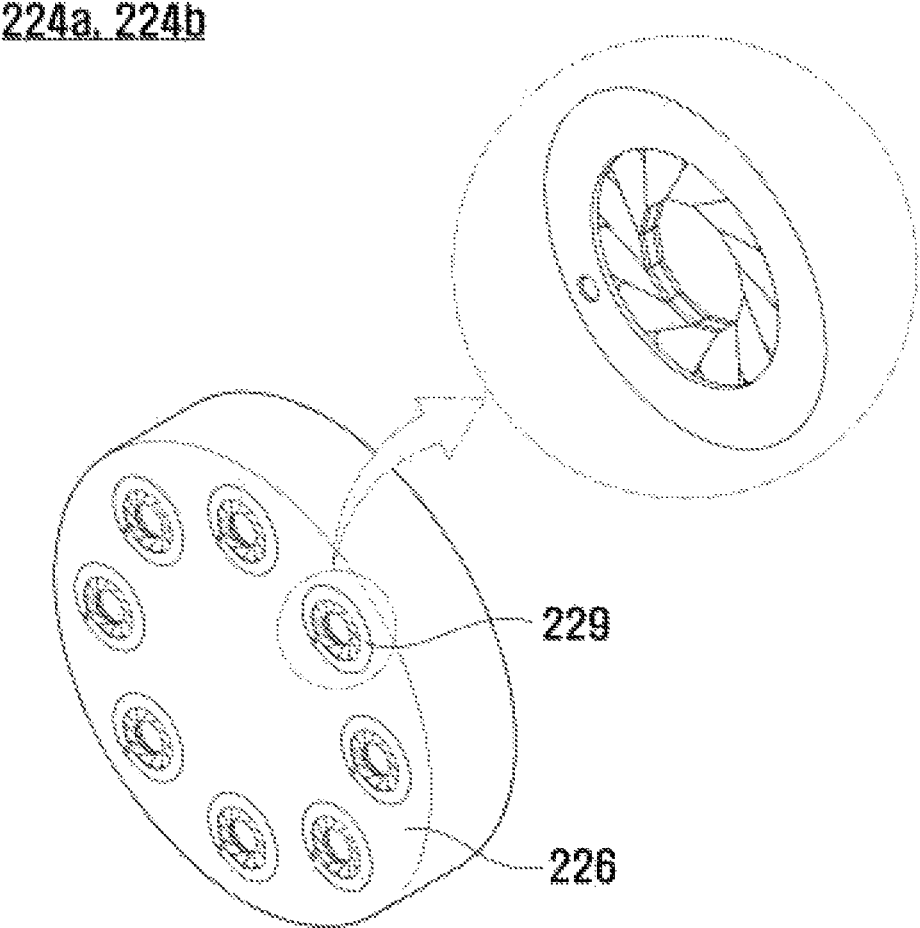

[FIG. 11]
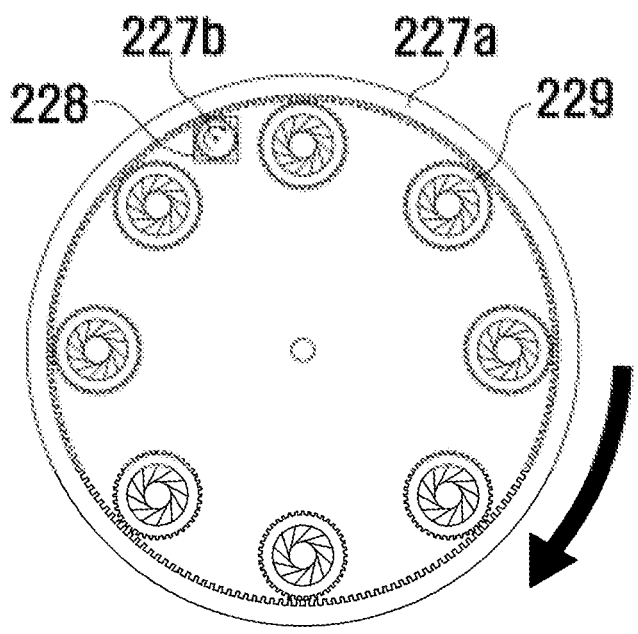
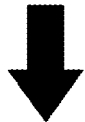
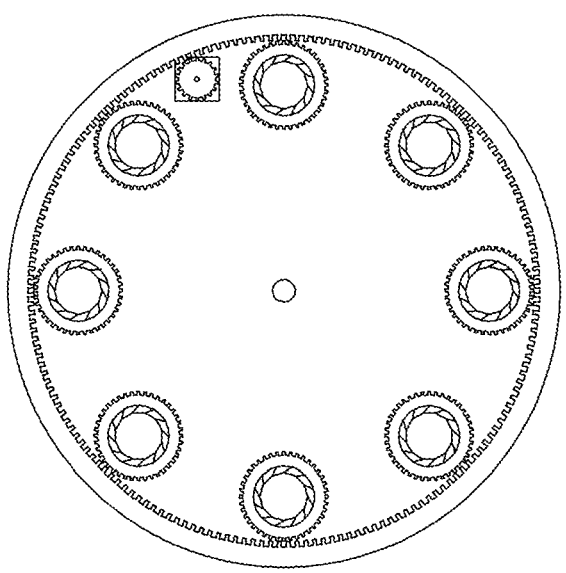

[FIG. 12]
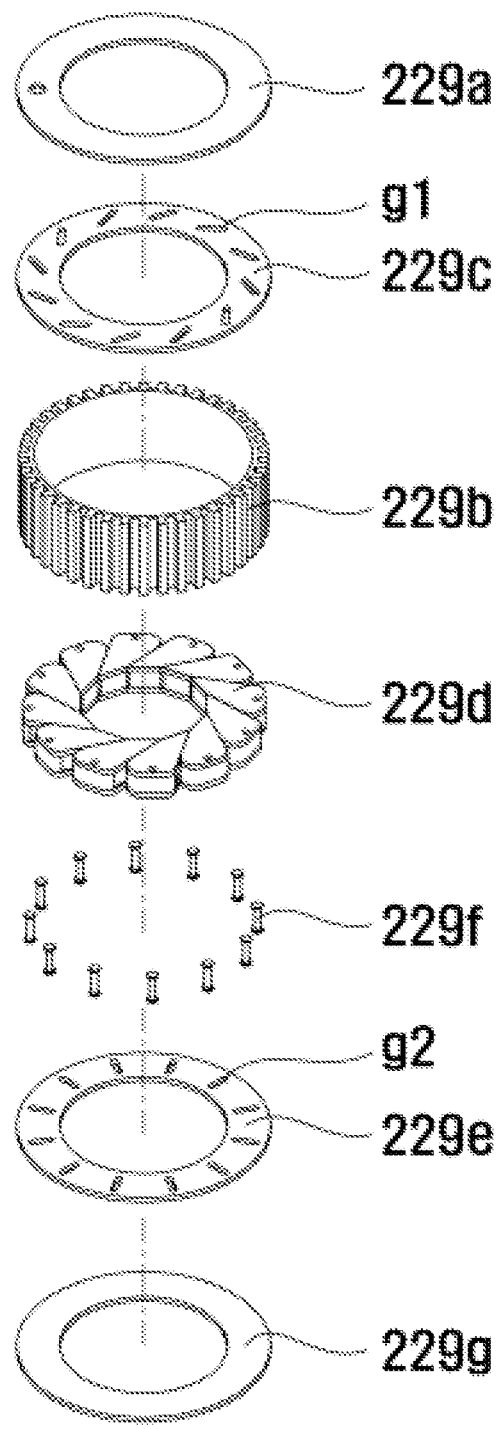

FLAME TRANSFER FUNCTION MEASUREMENT SYSTEM FOR PREDICTION AND REDUCTION OF COMBUSTION INSTABILITY

CROSS-REFERENCE TO RELATED APPLICATION

This application is a continuation-in part of U.S. patent application Ser. No. 16/882,701 filed May 25, 2020, which is incorporated herein by reference in its entirety.

FIELD

The present disclosure relates to a flame transfer function measurement system for prediction and reduction of combustion instability.

BACKGROUND

This work was supported by the National Research Foundation of Korea (NRF) grant funded by the Korea government (MSIP) Space Challenge Project (2021M1A3B-8075809), contracted through SNU Future Innovation Institute.

The combustion instability phenomenon, which is one of the biggest obstacles in developing engines to be installed in rockets, etc., refers to a phenomenon in which due to the interaction of the pressure perturbation inside a combustion chamber and the perturbation of the heat release rate, the two perturbations are greatly amplified. A large pressure perturbation inside the combustion chamber causes the combustion chamber to be destroyed, and a large perturbation in the heat release rate can cause fatigue failure due to heat, which becomes a problem.

The combustion instability phenomenon described above occurs due to a combination of the intrinsic characteristics of flame and the acoustic characteristics of the combustion chamber. Therefore, if the intrinsic characteristics of flame are known, combustion instability can be avoided by changing the intrinsic characteristics of flame by changing the combustion conditions, or by changing the acoustic characteristics by changing the structure of the combustion chamber, thereby preventing the interaction between the two.

The intrinsic characteristics of flame can be known from a flame transfer function. The flame transfer function is a linear thermoacoustic analysis model, and the result of such a flame transfer function can be derived from gains and phases. Here, a gain represents the size of the perturbation of the heat release rate inside the combustion chamber for a certain external perturbation, and a large gain means that the flame is unstable at that frequency. In addition, a phase showing a linearly decreasing tendency means that time delay is kept constant regardless of the frequency.

Meanwhile, existing flame transfer function measurement systems calculate the phase of the flame transfer function through the phase difference between the heat release rate perturbation and the velocity perturbation experimentally measured. In order to substitute such a phase of the flame transfer function into an existing combustion instability prediction program, it must be expressed in a certain function form, but an existing flame transfer function measurement system has a cumbersome problem that it requires a process where an experimenter adds or subtracts $2n\pi$ (n is an integer) to or from the phases of the flame transfer function measured at each perturbation frequency one by one to rearrange the phases of the flame transfer function in a certain function form.

SUMMARY

A purpose of the present disclosure is to resolve the aforementioned problems of prior art, that is, to provide a flame transfer function measurement system for prediction and reduction of combustion instability that is capable of obtaining the flame transfer function at the entire frequency range at once by automatically converting the range of the frequency to be measured such that the experimentally calculated phase of the flame transfer function can be rearranged and expressed in a function form substitutable into an existing combustion instability prediction program and such that the intensity of the external excitation is kept constant.

The aforementioned purpose may be achieved according to the present disclosure by a flame transfer function measurement system for prediction and reduction of combustion instability, including an accommodation part for accommodating a reactant; a perturbation part that is connected with the accommodation part, and that applies perturbation of a preset frequency to the reactant supplied from the accommodation part; a pipe part that is connected with the perturbation part, and where the reactant applied with the perturbation may be moved; a combustion part that is connected to the pipe part, and where the reactant supplied from the pipe part is burned to generate flame; a velocity perturbation measurement part that is installed in the pipe part, and that measures a velocity perturbation of the reactant applied with the perturbation to generate velocity perturbation information; a self-luminescence measurement part that is disposed at an outer side of the combustion part, and that measures a radical self-luminescence signal discharged from the flame and generates radical self-luminescence information; and a calculation part that is electrically connected with the perturbation part, the velocity perturbation measurement part and the self-luminescence measurement part, and that calculates heat release rate perturbation information of the flame based on the radical self-luminescence information, and calculates a flame transfer function based on the velocity perturbation information and the heat release rate perturbation information, wherein the calculation part calculates a phase of the flame transfer function at each frequency from the heat release rate perturbation information and the velocity perturbation information, and the calculation part automatically corrects the phase of the flame transfer function at each frequency.

Preferably, the calculation part may calculate a gain at each frequency of the flame transfer function.

Preferably, the calculation part may control the perturbation part such that, when a plurality of measurement target frequencies are input, the flame transfer function can be calculated.

Preferably, the perturbation part may include an electric part; a rotor that may be fastened to the electric part and be rotated; a first disk that may be fastened to the rotor and be rotated, and that has a plurality of first holes through which the reactant may pass; and a second disk that may be fixed to the first disk so as to contact one surface of the first disk and be rotated together, and that overlaps with the first hole and has a plurality of second holes through which the reactant may pass.

Preferably, the second disk may be rotated at a preset angle and then fixed to the first disk such that an extent the second hole overlaps with the first hole is adjusted.

According to the present disclosure, since the phase at each frequency is automatically corrected such that a plurality of phases of the flame transfer function can be rearranged and expressed in a function form that is substitutable into the existing combustion instability prediction program, there is an effect that the tendency of the phase derived from the flame transfer function can be grasped quickly.

Meanwhile, the effects of the present disclosure are not limited to the aforementioned effects, but rather, various effects may be included within the range apparent to those skilled in the art from the description below.

BRIEF DESCRIPTION OF THE DRAWINGS

FIG. 1 is an overall illustration of the flame transfer function measurement system for prediction and reduction of combustion instability according to an embodiment of the present disclosure;

FIG. 2 is an illustration of the connection between the components of the flame transfer function measurement system for prediction and reduction of combustion instability according to an embodiment of the present disclosure;

FIG. 3 is a graph prior to correction of the phase at each frequency of the flame transfer function obtained by the flame transfer function measurement system for prediction and reduction of combustion instability according to an embodiment of the present disclosure;

FIG. 4 is a graph after the correction of the phase at each frequency of the flame transfer function obtained by the flame transfer function measurement system for prediction and reduction of combustion instability according to an embodiment of the present disclosure;

FIG. 5 is a graph illustrating the gain and phase of the flame transfer function obtained by the flame transfer function measurement system for prediction and reduction of combustion instability according to an embodiment of the present disclosure;

FIG. 6 is an illustration of a perturbation part of the flame transfer function measurement system for prediction and reduction of combustion instability according to an embodiment of the present disclosure;

FIG. 7 is an illustration in which a second disk of the flame transfer function measurement system for prediction and reduction of combustion instability according to an embodiment of the present disclosure is rotated by a preset angle such that an extent that a second hole overlaps with a first hole is adjusted;

FIG. 8 is an illustration of a process in which after a case part of the perturbation part of the flame transfer function measurement system for prediction and reduction of combustion instability according to an embodiment of the present disclosure is opened, the second disk is rotated by a preset angle;

FIG. 9 is an illustration of the connection between the components of the flame transfer function measurement system for prediction and reduction of combustion instability according to another embodiment of the present disclosure;

FIG. 10 is an illustration of the first disk or second disk of the perturbation part of the flame transfer function measurement system for prediction and reduction of combustion instability according to another embodiment of the present disclosure;

FIG. 11 is an illustration of an operation process of an adjustment part of the flame transfer function measurement system for prediction and reduction of combustion instability according to another embodiment of the present disclosure; and FIG. 12 is an exploded perspective view of the adjustment part of the flame transfer function measurement system for prediction and reduction of combustion instability according to another embodiment of the present disclosure.

DETAILED DESCRIPTION

Hereinbelow, some of the embodiments of the present disclosure will be described in detail based on the exemplary drawings. In adding reference numerals to the components of each drawing, it should be noted that the same components are given the same reference numerals as much as possible even when they are indicated on different drawings.

In addition, in describing the embodiments of the present disclosure, when it is determined that a detailed description of a related known constitution or function interferes with understanding the embodiments of the present disclosure, the detailed description thereof will be omitted.

Further, in describing the components of the embodiments of the present disclosure, terms such as first, second, A, B, (a), (b) and the like can be used. These terms are only for distinguishing the components from other components, and the essence, order, or sequence of the corresponding components are not limited by the terms.

Hereinafter, the flame transfer function measurement system for prediction and reduction of combustion instability according to an embodiment of the present disclosure 100 will be described in detail with reference to the drawings attached.

FIG. 1 is an overall illustration of the flame transfer function measurement system for prediction and reduction of combustion instability according to an embodiment of the present disclosure, FIG. 2 is an illustration of the connection between the components of the flame transfer function measurement system for prediction and reduction of combustion instability according to an embodiment of the present disclosure, FIG. 3 is a graph prior to correction of the phase at each frequency of the flame transfer function obtained by the flame transfer function measurement system for prediction and reduction of combustion instability according to an embodiment of the present disclosure, FIG. 4 is a graph after the correction of the phase at each frequency of the flame transfer function obtained by the flame transfer function measurement system for prediction and reduction of combustion instability according to an embodiment of the present disclosure, FIG. 5 is a graph illustrating the gain and phase of the flame transfer function obtained by the flame transfer function measurement system for prediction and reduction of combustion instability according to an embodiment of the present disclosure, FIG. 6 is an illustration of a perturbation part of the flame transfer function measurement system for prediction and reduction of combustion instability according to an embodiment of the present disclosure, FIG. 7 is an illustration in which a second disk of the flame transfer function measurement system for prediction and reduction of combustion instability according to an embodiment of the present disclosure is rotated by a preset angle such that an extent that a second hole overlaps with a first hole is adjusted, and FIG. 8 is an illustration of a process in which after a case part of the perturbation part of the flame transfer function measurement system for prediction and reduction of combustion instability according to an embodiment of the present disclosure is opened, the second disk is rotated by a preset angle.

In an existing combustion instability prediction program, a combustion instability prediction result is generally derived after going through a combustion chamber shape input step, a thermodynamic state input step, a flame transfer function input step and an acoustic condition input step.

Here, at the flame transfer function input step, a phase of the flame transfer function calculated through the phase difference between the velocity perturbation and the heat release rate perturbation experimentally measured is input, and in order to convert the phase of the flame transfer function obtained through the existing flame transfer function measurement system into a certain function form and input the same, a process where the experimenter rearranges the phases of the flame transfer function in a certain function form by adding or subtracting $2n\pi$ (n is an integer) to or from the phases of the flame transfer function measured at each perturbation frequency one by one is needed, which is a cumbersome problem.

Here, the existing combustion instability prediction program may be a commercial program such as Ansys, COMSOL and the like; an open source program such as OSCILOS and OpenFoam, and the function may have the forms of a linear, poles and zeros, state-space model and the like, but there is no limitation thereto.

In more detail, according to the flame transfer function measurement system for prediction and reduction of combustion instability according to an embodiment of the present disclosure 100, the flame transfer function is calculated, and the flame transfer function may be expressed in [Equation 1] shown below.

$$FTF(\omega) = G(f) = \frac{Q'/\overline{Q}}{u'/\overline{u}} = n(\omega)e^{i\omega\tau} \qquad \text{[Equation 1]}$$

Here, FTF means the flame transfer function, $u'/\overline{u}$ means the velocity perturbation of the reactant, $Q'/\overline{Q}$ means the heat release rate perturbation of the flame, $\omega$ means the angular frequency, $\tau$ means the time delay until the effect of the velocity perturbation is transmitted to the flame and appears as a change in the heat release rate, and n means the gain.

The result of the flame transfer function can be expressed in gains and phases. The gain of the flame transfer function can be obtained by the absolute value of FTF, as shown in [Equation 2] below.

$$\text{Gain} = |G(f)| \qquad \text{[Equation 2]}$$

Further, the phase of the flame transfer function is calculated by obtaining the phase of the heat release rate perturbation, which is the numerator, and the phase of the velocity perturbation, which is the denominator, and then obtaining the difference between the two, which corresponds to $\omega\tau$ in [Equation 1], and as in [Equation 3] below, can be obtained through the angle of the real number part $G(f)_{real}$ and imaginary number part $G(f)_{im}$.

$$\text{Phase} = \tan^{-1}\left[\frac{G(f)_{im}}{G(f)_{real}}\right] \qquad \text{[Equation 3]}$$

If the gain and phase of the flame transfer function as described above are known, it is possible to know the characteristics of the flame. Using this, it is possible to grasp the characteristics of combustion instability. Therefore, in order to derive the flame transfer function through the flame transfer function measurement system for prediction and reduction of combustion instability according to an embodiment of the present disclosure 100, velocity perturbation information per frequency of the reactant and heat release rate perturbation information of flame must be measured, respectively.

Supposing the phase of the flame transfer function is linear, it is expressed as in [Equation 4] below.

$$\theta = -\tau\omega \qquad \text{[Equation 4]}$$

Here, $\theta$ means the phase of the flame transfer function, $\tau$ means the slope, and $\omega$ means the angular frequency.

When the phase is $\phi$, this means the same phase as phase $\phi 2n\pi$ (here, n is an arbitrary integer). That is, at perturbation frequency f1, if the phase of the heat release rate perturbation was measured as being $\Phi_1+2a\pi$, and the phase of the velocity perturbation was measured as being $\phi 2+2b\pi$, the phase of the flame transfer function at frequency f1 is calculated as being $\phi 1-\phi 2+2(a-b)\pi$, and as such, the phase of the flame transfer function regarding all perturbation frequencies can be calculated. However, since the phase of the flame transfer function is measured experimentally, a data set of the phase of the flame transfer function consists of a data set at a plurality of points rather a continuous line.

That is, there is a difference of finite value between the phase of the flame transfer function at perturbation frequency f1 and the phase of the flame transfer function at the next perturbation frequency f2. Here, by $2(a-b)\pi$ term, the difference may be very large or very small, and the difference may be positive or negative.

In order to substitute the phase of the flame transfer function into the existing combustion instability prediction program, it must be expressed in a certain function form, but the existing flame transfer function measurement system has a cumbersome problem that it requires a process where the experimenter adds or subtracts $2n\pi$ (n is an integer) to or from the phases of the flame transfer function measured at each perturbation frequency one by one to rearrange the phases of the flame transfer function in a certain function form.

As illustrated in FIGS. 1 to 2, the flame transfer function measurement system for prediction and reduction of combustion instability according to an embodiment of the present disclosure 100 includes an accommodation part 110, a perturbation part 120, a pipe part 130, a combustion part 140, a velocity perturbation measurement part 150, a self-luminescence measurement part 160, an exhaust part 170 and a calculation part 180.

The accommodation part 110 provides a space for accommodating a reactant, and the accommodation part 110 is connected to the perturbation part 120. When the accommodation part 110 supplies the reactant to the perturbation part 120, the reactant is applied with perturbation at a preset frequency in the perturbation part 120 and is then transmitted to the combustion part 140 through the pipe part 130. Here, the reactant may include any one or more of a fuel or an oxidizing agent. According to an embodiment, such an accommodation part 110 may be a high-pressure gas container of various specification, such as 46.7 L (width 145 cm, length 23.2 cm), 40.2 L (width 125 cm, length 23.2 cm) and the like.

The perturbation part 120 is constituted as a Siren type to apply perturbation of a preset frequency to the reactant supplied from the accommodation part 110, and is connected to the accommodation part 110, and is electrically connected to the calculation part 180.

Meanwhile, the reactant being supplied to the perturbation part 120 may be supplied through a bypass structure. That is, the pipe connected to the accommodating part 110 may be diverged into two branches; a portion connected to the perturbation part 120, while the other directly connected to the pipe part 130 in the perturbation part 120. Accordingly, of the reactant diverged into two branches, perturbation will be applied to only the reactant that passes the disk of the perturbation part 120, and the reactant diverged into two branches are mixed before flowing into the combustion part 140, leading to a state where perturbation is applied to the entire reactant. This is because, when the entire reactant is supplied through the perturbation part 120, the reactant flow when the hole of the disk 124 of the perturbation part 120 is blocked, becomes 0, and thus the flame in the combustion part 140 may be extinguished.

In more detail, the perturbation part 120 includes a case 121, an electric part 122, a rotor 123, a first disk 124*a*, a second disk 124*b* and a fixing pin 125.

The case 121 has the rotor 123, the first disk 124*a* and the second disk 124*b*, disposed inside thereof, and the case 121 is where the space for accommodating the reactant supplied from the accommodation part 110 is formed. An inlet for receiving the supply of the reactant from the accommodation part 110 is formed at one side, and an outlet for supplying the reactant applied with perturbation to the pipe part 130 is formed at the other side. Here, the case 121 has a rotation part 126 on a lower portion of the surface where the outlet is formed, so that the surface where the outlet is formed may be rotated outwardly and be opened.

The electric part 122 is for providing rotational force to the rotor 123, and is fastened to the rotor 123. Here, the rotation speed of the electric part 122 may be adjusted depending on the control of the calculation part 180. According to an embodiment, the electric part 122 may be a variable rotation speed AC motor such as 1LA7063-4AB90 from Siemens.

The rotor 123 may be fastened to the electric part 122 to be rotated, and the first disk 124*a* and the second disk 124*b* may be fastened to an end portion of the rotor 123, respectively.

A plurality of first holes h1 through which the reactant may pass, are formed penetrating the first disk 124*a*. The first disk 124*a* is fastened to the rotor 123 so that it rotates together as the rotor 123 rotates. Here, the number of the first holes h1 may differ depending on the required perturbation frequency, and the diameter may differ depending on the required perturbation intensity.

A plurality of second holes h2 through which the reactant may pass, are formed penetrating the second disk 124*b*. The second disk 124*b* may be fastened to the rotor 123 so as to be in contact with one surface of the first disk 124*a*, and be rotated together as the rotor 123 rotates. Here, the second hole h2 may have the same diameter and number as the first hole h1.

As illustrated in FIG. 7, here, when the first hole h1, the second hole h2 and the outlet of the case 121 overlap one another, the reactant may be supplied to the pipe part 130. Here, supply and cut-off of the reactant are repeated depending on the rotation of the first disk 124*a* and the second disk 124*b*, thereby applying perturbation of the preset frequency to the reactant.

The fixing pin 125 is for fixing the first disk 124*a* and the second disk 124*b* to each other, so that the first disk 124*a* and the second disk 124*b* may be rotated at the same rotation speed. In the second disk 124*b*, a plurality of second fixing grooves p2 may be formed, where the fixing pin 125 may penetrate and be inserted, and in the first disk 124*a*, a plurality of first fixing grooves p1 may be formed, that communicate with the second fixing groove p2 and where the fixing pin 125 may be inserted.

Meanwhile, depending on the perturbation intensity, a slight difference of gain and phase of the flame transfer function will occur, and thus it is important to apply a constant perturbation intensity when measuring the flame transfer function.

As illustrated in FIG. 7, to adjust the perturbation intensity being applied to the reactant, the second disk 124*b* may be rotated by a preset angle and then fastened to the rotor 123, thereby adjusting the extent the second hole h2 overlaps with the first hole h1. Here, in the second disk 124*b*, a pair of second fixing grooves p2 may be formed, through which the fixing pin 125 may penetrate and be inserted, and in the first disk 124*a*, a plurality of first fixing grooves p1 may be formed along a circumferential direction such that the second disk 124*b* may be rotated by a preset angle and then be fixed (so that the extent the second hole h2 overlaps with the first hole h1 may be adjusted in various ways).

That is, as illustrated in FIG. 8, when the surface where the outlet of the case 121 is formed is rotated outwardly and opened, and the plurality of fixing pins 125 that fixed the first disk 124*a* and the second disk 124*b* are removed, and then the second disk 124*b* is rotated by a preset angle to adjust the extent the first hole h1 and the second hole h2 overlap with each other, and then the first disk 124*a* and the second disk 124*b* are fixed with the fixing pin 125, it is possible to easily adjust the intensity of the perturbation being applied to the reactant without having to replace the disk.

The pipe part 130 is for allowing the reactant applied with the perturbation to be moved to the combustion part 140, and the pipe part 130 is connected with the perturbation part 120. In such a pipe part 130, a velocity perturbation measurement part 150 is installed to measure the velocity perturbation of the reactant to which the perturbation is applied, and at a rear end of the pipe part 130, a spray nozzle for spraying the reactant is formed.

According to an embodiment, the pipe part 130 may have a length of 600 mm, and the spray nozzle may be a partial premix nozzle having a form in which the reactant is sprayed to the air in a jet in cross form from a vane having a preset angle.

The combustion part 140 is where the reactant supplied from the pipe part 130 is burned to generate flame. The combustion part 140 is connected to the pipe part 130 to receive the fluid applied with perturbation from the pipe part 130. Such a combustion part 140 may be formed in a hexahedral shape made of quartz material where one surface and the other surface are transparent so that a self-luminescence measurement part 160 can measure a radical self-luminescence signal emitted from the flame, and the combustion part 140 may be formed in a cylindrical shape made of quartz material. According to an embodiment, such a combustion part 140 may be formed to have a size of 230 mm in length and 150 mm in width.

The velocity perturbation measurement part 150 is for measuring the velocity perturbation of the reactant applied with perturbation and for generating velocity perturbation information. The velocity perturbation measurement part 150 is installed in the pipe part 130, and is electrically connected to the calculation part 180 to transmit the measured velocity perturbation information to the calculation part 180. According to an embodiment, such a velocity perturbation measurement part 150 may be a hot-wire anemometer (HWA) such as MiniCTA of Dantec.

The self-luminescence measurement part 160 is for measuring the radical self-luminescence signal emitted from the flame and for generating radical self-luminescence information, and is disposed at an outer side of the combustion part 140, and is electrically connected to the calculation part 180 to transmit the measured radical self-luminescence information to the calculation part 180.

When calculating the flame transfer function, since the heat release rate cannot be directly measured, the radical self-luminescence signal is measured and it is assumed that it is proportional to the heat release rate signal. According to an embodiment, for the radical self-luminescence signal, an OH radical chemiluminescence or a CH radical chemiluminescence may be used.

In more detail, such a self-luminescence measurement part 160 includes a camera part 161 and a light detection part 162.

The camera part 161 is for photographing the flame of the combustion part 140 and for generating a first radical self-luminescence information. The camera part 161 is disposed at an outer side of the combustion part 140, and according to an embodiment of the present disclosure, such a camera part 161 may be a complementary metal-oxide semiconductor (CMOS) camera such as HighspeedStar 8 of LaVision, or a charge-coupled device camera (CCD).

Here, the first radical self-luminescence information may be a 2D radical self-luminescence image, and when the heat release rate is calculated using such a 2D radical self-luminescence image of the camera part 161, there is a disadvantage that it takes a long time and that it requires post-processing, but there is also an advantage of obtaining an image that shows the structure of the flame.

The light detection part 162 is for measuring the light generated in the flame of the combustion part 140 and for generating a second radical self-luminescence information. The light detection part 162 is disposed at an outer side of the combustion part 140, and according to an embodiment of the present disclosure, such a light detection part 162 may be a photomultiplier tube (PMT) such as H7732-10 of Hamamatsu.

Here, the second radical self-luminescence information may be a 1D signal, and such a light detection part 162 integrates and measures the self-luminescence intensity of the Field of View (FOV) through the PMT, thereby obtaining the 1D signal, and thus there is an advantage that measurement and storage time is fast. However, there is a disadvantage that it is difficult to precisely grasp the FOV and that it is not possible to grasp the 2D structure of the flame.

The exhaust part 170 is for cooling and discharging to the outside the toxic gas generated by the flame of the combustion part 140, and may be spaced apart and disposed at a rear end of the combustion unit 140, or fastened with the combustion part 140.

The calculation part 180 is for calculating the heat release rate perturbation information of the flame based on the first radical self-luminescence information and the second radical self-luminescence information generated through the self-luminescence measurement part 160, that is, the camera part 161 and the light detection part 162, and for calculating the flame transfer function based on the velocity perturbation information and the heat release rate perturbation information. The calculation part 180 is electrically connected with the perturbation part 120, the velocity perturbation measurement part 150 and the self-luminescence measurement part 160. When a plurality of measurement target frequencies are input, such a calculation part 180 may control the perturbation part 120 such that the flame transfer function for each frequency can be calculated. According to an embodiment, such a calculation part 180 may be a personal computer (PC), and programs such as Labview, Matlab and the like may be used in the calculation.

Here, the calculation part 180 outputs the gain and phase at each frequency of the flame transfer function, and the calculation part 180 may automatically correct the phase of the flame transfer function experimentally calculated to be rearranged and expressed in a function form substitutable into the existing combustion instability prediction program.

As mentioned above, experimentally, the phase of the flame transfer function is calculated by obtaining the phase of the heat release rate perturbation, that is the numerator, and the phase of the velocity perturbation, that is the denominator, respectively, and then through the difference between the two. The phase of the flame transfer function being calculated and output from the existing flame transfer function measurement system is as illustrated in FIG. 3, and in FIG. 3, x axis means the perturbation frequency (Hz), and y axis means the phase (rad).

There was a cumbersome problem that in order to substitute the phases of the flame transfer function being output from the existing flame transfer function measurement system into the existing combustion instability prediction program, $2n\pi$ had to be added or subtracted to or from the phases of the flame transfer function at each frequency.

Accordingly, in the present disclosure, the phase of the flame transfer function at each frequency is automatically corrected, such that a plurality of phases of the flame transfer function can be rearranged and expressed in a function form that is substitutable into the existing combustion instability prediction program.

In more detail, the calculation part 180 may add $\pm 2n\pi$ to the phase of the flame transfer function such that the difference of phases of one pair of frequencies that are adjacent to each other is maintained within a range of $-\pi$ to $\pi$ (to be maintained within a range of $-180°$ to $180°$ when expressed in degree unit). For example, when the difference of phases of the flame transfer function at two adjacent perturbation frequencies is derived as being $450°$, the calculation part 180 may convert by adding $-360°$ to the phase of the flame transfer function at a higher perturbation frequency such that the difference between the two phases becomes $90°$. Here, the phase may be converted in radian units and be output.

After the phase of the flame transfer function is rearranged and expressed in a certain function form, the graph regarding the phase and gain of the flame transfer function as illustrated in FIG. 5 may be derived, and when the phase of the flame transfer function rearranged and expressed in a certain function form is substituted into the existing combustion instability prediction program, a combustion instability prediction result can be output.

Here, an amplification ratio of the heat release rate perturbation or the pressure perturbation may be inferred through the gain of the flame transfer function, and a higher gain means that a stronger perturbation may occur.

Further, the phase of the flame transfer function means the phase difference between the heat release rate perturbation and the velocity perturbation as mentioned above, and plays the role of a variable from which the phase difference of the heat release rate perturbation and the pressure perturbation can be inferred, and through such gain and phase, it becomes possible to predict the combustion instability.

According to the calculation part 180 as mentioned above, there is an effect of quickly grasping the tendency of the phase of the flame transfer function as in FIG. 4, and the phase of the flame transfer function at a perturbation frequency where no actual experiment has been performed can be predicted through linear interpolation.

Further, there is an effect of expressing the flame transfer function in a certain function form such that it can be substituted into an existing combustion instability prediction program.

According to the flame transfer function measurement system for prediction and reduction of combustion instability according to an embodiment of the present disclosure 100 as mentioned above, the phase of the flame transfer function at each frequency can be automatically corrected, such that the plurality of phases of the flame transfer function can be rearranged and expressed in a function form substitutable into an existing combustion instability prediction program, and thus there is an effect of quickly grasping the tendency of the phase being derived from the flame transfer function.

Hereinbelow, with reference to the drawings attached, the flame transfer function measurement system for prediction and reduction of combustion instability according to another embodiment of the present disclosure 200 will be described in detail.

FIG. 9 is an illustration of the connection between the components of the flame transfer function measurement system for prediction and reduction of combustion instability according to another embodiment of the present disclosure, FIG. 10 is an illustration of the first disk or second disk of the perturbation part of the flame transfer function measurement system for prediction and reduction of combustion instability according to another embodiment of the present disclosure, FIG. 11 is an illustration of an operation process of an adjustment part of the flame transfer function measurement system for prediction and reduction of combustion instability according to another embodiment of the present disclosure, and FIG. 12 is an exploded perspective view of the adjustment part of the flame transfer function measurement system for prediction and reduction of combustion instability according to another embodiment of the present disclosure.

The following [Equation 5] represents an equation of flow rate according to the size area (sum of the size area of bypass and the open size area of the disk hole) of the pipe part when choking occurred in the pipe part 230.

$$\dot{m} = \frac{0.685}{\sqrt{RT_0}} P_0 \pi r_{crit}^2 = \frac{0.685}{\sqrt{RT_0}} P_0 A_{crit} \qquad \text{[Equation 5]}$$

Here, $\dot{m}$ means the mass flow rate, R means the gas constant, $P_0$ means the backpressure, $T_0$ means the temperature, $R_{crit}$ means the radius when assuming the size area (sum of the size area of the bypass and the open size area of the disk hole) of the pipe part to be circular, and $A_{crit}$ means the size area (sum of the size area of the bypass and the open size area of the disk hole) of the pipe part.

As can be seen from [Equation 5] above, when the size area increases, the mass flow rate increases. That is, the mass flow rate changes according to the size of the disk hole, and this is related to the intensity of perturbation.

Meanwhile, in an existing Siren-type flow perturbation device, intensity of perturbation is adjusted by either varying the size of the disk hole, or adjusting the ratio of the bypass through a valve.

However, the method of varying the size of the disk hole is practically impossible because the size of the hole must be changed each time according to the flow rate and frequency. Further, the method of adjusting the ratio of the bypass through a valve is disadvantageous in that the experimenter has to adjust the extent of opening or closing the valve while checking the perturbation intensity in real time.

Thus, a constitution is required that can automatically adjust the size of the disk hole according to the perturbation intensity required in real time.

As illustrated in FIG. 9, the flame transfer function measurement system for prediction and reduction of combustion instability according to another embodiment of the present disclosure 200 includes an accommodation part 210, a perturbation part 220, a pipe part 230, a combustion part 240, a velocity perturbation measurement part 250, a self-luminescence measurement part 260, an exhaust part 270 and a calculation part 280.

Here, the accommodation part 210, the pipe part 230, the combustion part 240, the velocity perturbation measurement part 250, the self-luminescence measurement part 260, the exhaust part 270 and the calculation part 280 are the same as the constitution of the flame transfer function measurement system for prediction and reduction of combustion instability according to an embodiment of the present disclosure 100 mentioned above, and thus repeated explanation will be omitted.

The perturbation part 220 is constituted in the Siren-type to apply perturbation of a preset frequency to the reactant supplied from the accommodation part 210. The perturbation part 220 is connected to the accommodation part 210, and is electrically connected to the calculation part 280.

In detail, such a perturbation part 220 includes a case 221, an electric part 222, a rotor 223, a first disk 224a, a second disk 224b and a fixing pin 225.

Here, the case 221, the electric part 222, the rotor 223 and the fixing pin 225 are the same as the constitution of the flame transfer function measurement system for prediction and reduction of combustion instability according to an embodiment of the present disclosure 100 mentioned above, and thus repeated explanation will be omitted.

A plurality of first holes h1 through which the reactant may pass, are formed penetrating the first disk 224a. The first disk 224a is fastened to the rotor 223 so that it is rotated together as the rotor 223 rotates.

A plurality of second holes h2 through which the reactant may pass, are formed penetrating the second disk 224b. The second disk 224b may be fastened to the rotor 223 so as to be in contact with one surface of the first disk 224a, and be rotated together as the rotor 223 rotates.

As illustrated in FIGS. 10 to 11, such a first disk 224a and/or a second disk 224b each includes a plate 226, a first gear 227a, a second gear 227b, a driving module 228 and an adjustment part 229.

The plate 226 constitutes the outer shape of the first disk 224a (or the second disk 224b), and a plurality of first holes h1 (or second holes h2) are formed penetrating the plate 22. The first gear 227a, the second gear 227b, the driving module 228 and the adjustment part 229 are installed inside the plate 226.

The first gear 227a is provided as a ring gear having a plurality of gear teeth formed on an inner circumference thereof, and the second gear 227b and the adjustment part 229 are meshed on the inner circumference thereof, and is installed inside the plate 226.

The second gear 227b is meshed with the first gear 227a so that the first gear 227a can be rotated, and is installed inside the plate 226.

The driving module 228 is connected with the second gear 227b to provide rotational force to the second gear 227b, and is installed inside the plate 226 and fixed, and is electrically connected to the calculation part 280. Such a driving module 228 may be provided as a general motor.

A plurality of adjustment parts 229 are for adjusting the size of a plurality of first holes h1 (or second holes h2) formed in the first disk 224a (or the second disk 224b) such that the intensity of the perturbation applied to the reactant can be adjusted. The plurality of adjustment parts 229 are each installed inside the plate 226 so as to be meshed with the first gear 227a. Here, the plurality of adjustment parts 229 are each disposed in the first hole h1 (or the second hole 2).

As illustrated in FIG. 12, in more detail, such an adjustment part 229 includes an upper cover 229a, an adjustment gear 229b, a rotation plate 229c, a blade 229d, a fixing plate 229e, a connecting pin 229f, and a lower cover 229g.

The upper cover 229a is for finishing an upper surface of the adjustment part 229 and is connected to the rotation plate 229c to rotate the rotation plate 229c. Through a groove formed on an upper surface of the upper cover 229a, the experimenter may manually adjust the size of the first hole h1 (or the second hole h2) by directly rotating the rotation plate 229c in a forward or reverse direction.

The adjustment gear 229b is provided as a ring gear having a plurality of gear teeth formed on its outer circumference where the first gear 227a may be meshed with to be rotated in a forward or reverse direction as the gear 227a rotates.

The rotation plate 229c is formed as a ring-shaped flat plate having a first guide groove g1 on its surface, and is coupled to the adjustment gear 229b to be rotatable together as the adjustment gear 229b rotates. Here, the first guide groove g1 is formed in an inclined oblique line shape in an outer circumference to inner circumference direction, and are formed along the circumferential direction in the same number as the blades 229d, and are formed to be spaced apart from each other at preset intervals.

The blade 229d is constituted in plurality for adjusting the size of the first hole h1 (or the second hole h2), each formed in a triangular shape and disposed below the rotation part such that they are in contact to each other, and constituted such that an inner space formed by the plurality of blades 229d that are in contact to each other forms a circle.

Such a blade 229d has a coupling protrusion on one side surface and a coupling groove on the other side surface, so that when the plurality of blades 229d contact each other, they can be coupled by the coupling protrusion and the coupling groove and be slided. Thereafter, when the adjustment gear 229b coupled with the rotation part is rotated in a forward or reverse direction, the diameter of the inner space that the plurality of blades 229d form can be increased or decreased.

The fixing plate 229e is made in a ring-shaped flat plate form and has a second guide groove g2 on its surface, and is disposed below the blade 229d, but is installed such that it stays fixed and is not rotated together even when the adjustment gear 229b and the rotation plate 229c rotate. Here, the second guide groove g2 is made in a straight line from its outer circumference towards its inner circumference, along the circumferential direction in the same number as the blade 229d, but spaced apart at a preset interval.

The connecting pin 229f may be inserted into the first guide groove g1, the second guide groove g2 and the blade 229d, to mutually fasten the rotation plate 229c, the fixing plate 229e and the blade 229d. The connecting pin 229f allows the blade 229d to be moved within the first guide groove g1 and the second guide groove g2 as the adjustment gear 229b and the rotation plate 229c rotate.

The lower cover 229g is for finishing a bottom surface of the adjustment part 229, and is made in a ring-shaped flat plate form and is disposed below the fixing plate 229e.

That is, when the second gear 227b that received the rotational force from the driving module 228 rotates, the first gear 227a having the ring-gear shape rotates in a forward or reverse direction. Thereafter, in each of the plurality of adjustment parts 229 meshed on the inner circumference of the first gear 227a, as the adjustment gear 229b is rotated in a forward or reverse direction according to the rotation direction of the first gear 227a, the diameter of the inner space (that is, the first hole h1 or the second hole h2) formed by the plurality of blades 229d may be increased or decreased. That is, as the diameter of the first hole h1 or the second hole h2 is increased or decreased, the perturbation intensity may be increased or decreased.

In addition, the operation of the driving module 228 may be controlled in real time by the calculation part 280 according to the perturbation intensity required in the experiment.

According to the flame transfer function measurement system for prediction and reduction of combustion instability according to another embodiment of the present disclosure 200 mentioned above, there is an effect of automatically adjusting the perturbation intensity applied to the reactant without having to replace the disk.

Hereinabove, even if all the components constituting the embodiments of the present disclosure are described to be combined or operate in combination, the present disclosure is not limited to such embodiments. That is, one or more of all the components may be selectively combined and operate as long as it is within the scope of the purpose of the present disclosure.

In addition, terms such as "include", "constitute", or "has/have" disclosed hereinabove means that the corresponding component may be inherent unless otherwise stated, and should be construed that other components may be further included rather than excluding any other components. All terms, including technical or scientific terms, have the same meaning as commonly understood by one of ordinary skill in the art to which the present disclosure pertains, unless otherwise defined. Terms commonly used, such as those defined in the dictionary, should be interpreted as being consistent with the contextual meaning of the related art, and are not interpreted in an ideal or excessively formal meaning unless explicitly defined in the present disclosure.

In addition, the above description is merely illustrative of the technical idea of the present disclosure, and various modifications and variations can be made by those of ordinary skill in the art to which the present disclosure pertains without departing from the essential characteristics of the present disclosure.

Therefore, the embodiments disclosed in the present disclosure are not intended to limit the technical spirit of the present disclosure, but to explain, and the scope of the technical spirit of the present disclosure is not limited by these embodiments. The protection scope of the present disclosure should be construed by the following claims, and all technical ideas within the scope equivalent thereto should be construed as being included in the scope of the present disclosure.

What is claimed is:

1. A flame transfer function measurement system for prediction and reduction of combustion instability, comprising:
- an accommodation part for accommodating a reactant;
- a perturbation part that is connected with the accommodation part, and that generates an acoustic perturbation of a preset frequency to the reactant supplied from the accommodation part;
- a pipe part that is connected with the perturbation part;
- a combustion part that is connected to the pipe part, and where the reactant supplied from the pipe part is burned to generate flame;
- a velocity perturbation measurement part that is installed in the pipe part, and that measures a velocity perturbation of the reactant to generate velocity perturbation information;
- a self-luminescence measurement part that is disposed at an outer side of the combustion part, and that measures a radical self-luminescence signal discharged from the flame and generates radical self-luminescence information; and
- a calculation part that is electrically connected with the perturbation part, the velocity perturbation measurement part and the self-luminescence measurement part, and that calculates heat release rate perturbation information of the flame based on the radical self-luminescence information, and calculates a flame transfer function based on the velocity perturbation information and the heat release rate perturbation information,
- wherein the calculation part calculates a phase of the flame transfer function at each frequency from the heat release rate perturbation information and the velocity perturbation information, and the calculation part automatically corrects the phase of the flame transfer function at each frequency,
- wherein the perturbation part comprises an electric part, a rotor that may be fastened to the electric part and be rotated, a first disk that may be fastened to the rotor and be rotated, and that has a plurality of first holes through which the reactant may pass, and a second disk that may be fixed to the first disk so as to contact one surface of the first disk and be rotated together, and that overlaps with the first hole and has a plurality of second holes through which the reactant may pass.

2. The flame transfer function measurement system for prediction and reduction of combustion instability according to claim 1,
wherein the calculation part calculates a gain at each frequency of the flame transfer function.

3. The flame transfer function measurement system for prediction and reduction of combustion instability according to claim 1,
wherein the second disk may be rotated at a preset angle and then fixed to the first disk such that an extent the second hole overlaps with the first hole is adjusted.

4. A flame transfer function measurement system for prediction and reduction of combustion instability, comprising:
- an accommodation part for accommodating a reactant;
- a perturbation part that is connected with the accommodation part, and that generates an acoustic perturbation of a preset frequency to the reactant supplied from the accommodation part;
- a pipe part that is connected with the perturbation part;
- a combustion part that is connected to the pipe part, and where the reactant supplied from the pipe part is burned to generate flame;
- a velocity perturbation measurement part that is installed in the pipe part, and that measures a velocity perturbation of the reactant to generate velocity perturbation information;
- a self-luminescence measurement part that is disposed at an outer side of the combustion part, and that measures a radical self-luminescence signal discharged from the flame and generates radical self-luminescence information; and
- a calculation part that is electrically connected with the perturbation part, the velocity perturbation measurement part and the self-luminescence measurement part, and that calculates heat release rate perturbation information of the flame based on the radical self-luminescence information, and calculates a flame transfer function based on the velocity perturbation information and the heat release rate perturbation information,
- wherein the calculation part calculates a phase of the flame transfer function at each frequency from the heat release rate perturbation information and the velocity perturbation information, and the calculation part automatically corrects the phase of the flame transfer function at each frequency by keeping the phase difference between the heat release rate perturbation and the velocity perturbation within a range of $-180°$ to $180°$.

5. The flame transfer function measurement system for prediction and reduction of combustion instability according to claim 4,
wherein the calculation part calculates a gain at each frequency of the flame transfer function.

* * * * *